United States Patent [19]

Vero et al.

[11] Patent Number: 5,070,624
[45] Date of Patent: Dec. 10, 1991

[54] TWO-STAGE PNEUMATIC CONVEYING PROCESS FOR RUBBER COOLING

[75] Inventors: Gregory M. Vero, Camberwell, Australia; Brenton G. Jones, Brusssels, Belgium; Ronald C. Kowalski, New Providence, N.J.

[73] Assignee: Exxon Chemical Patents Inc., Linden, N.J.

[21] Appl. No.: 512,246

[22] Filed: Apr. 20, 1990

[51] Int. Cl.⁵ ............................................... F26B 7/00
[52] U.S. Cl. ........................................... 34/20; 34/17; 34/22; 34/60; 34/62; 55/431; 55/466
[58] Field of Search ................... 34/17, 22, 60, 62, 20; 55/417, 431, 466

[56] References Cited

U.S. PATENT DOCUMENTS

| | | |
|---|---|---|
| 992,939 | 5/1911 | Bühler .................... 34/62 X |
| 2,436,355 | 2/1948 | Cadot et al. . |
| 2,458,357 | 1/1949 | Evans . |
| 3,265,775 | 8/1966 | Friedrich . |
| 3,370,358 | 2/1968 | Esser et al. ................ 34/17 X |
| 3,384,420 | 5/1968 | Fiscus . |
| 3,629,951 | 12/1971 | Davis et al. . |
| 4,076,493 | 2/1978 | Gardner . |
| 4,189,299 | 2/1980 | Bourne . |
| 4,231,991 | 11/1980 | Müller . |
| 4,365,057 | 12/1982 | Saito et al. . |
| 4,441,261 | 4/1984 | Beckmann . |
| 4,599,016 | 7/1986 | Medemblik . |

Primary Examiner—Henry A. Bennet
Assistant Examiner—Christopher B. Kilner
Attorney, Agent, or Firm—M. L. Gibbons

[57] ABSTRACT

A process for cooling rubber crumb wherein the rubber crumb is presented for cooling to a first stage pneumatic conveyor containing a hot wet first stage air stream. The rubber crumb is cooled in the first stage pneumatic conveyor to a first temperature, whereupon the cooled rubber crumb is separated from the first stage air stream and transferred to a second stage air stream of cool dry air. A second stage pneumatic conveyor transports the rubber crumb in the second stage air stream for additional cooling.

4 Claims, 1 Drawing Sheet

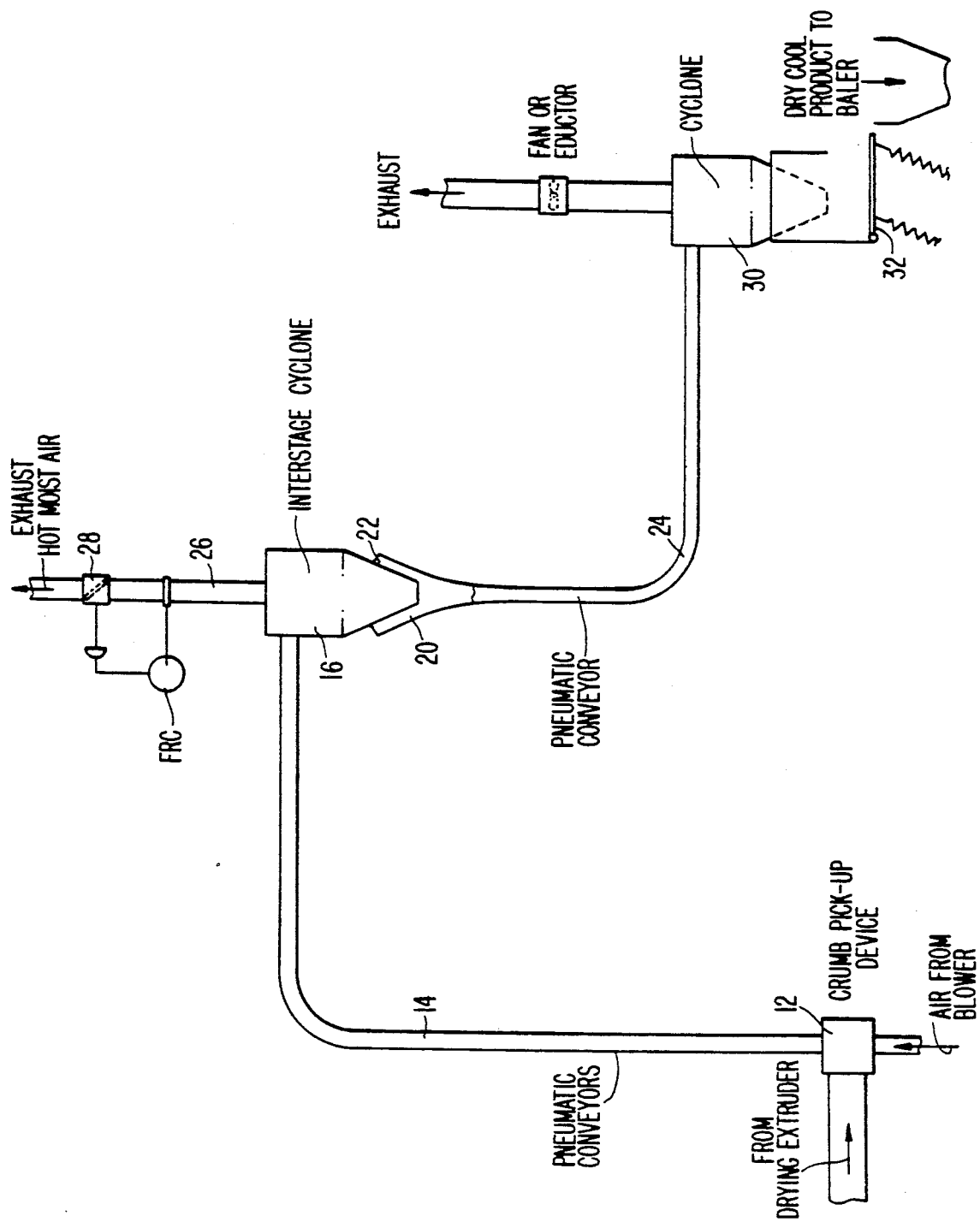

5,070,624

TWO-STAGE PNEUMATIC CONVEYING PROCESS FOR RUBBER COOLING

CROSS REFERENCE TO RELATED APPLICATION

The present application is related to applicant's copending patent application, filed simultaneously herewith, which is directed to an interstage cyclone separator. The subject matter of the present application is directed to a two-stage pneumatic conveying process for rubber cooling, in conjunction with which the interstage separator is intended to be utilized. The term "cyclone" as sometimes used herein to modify "separator" is for convenience of reference only and no limitation to a particular element is implied thereby.

BACKGROUND OF THE INVENTION

1. Field of the Invention

The invention broadly pertains to a method for cooling dry elastomeric polymer particles. More specifically, the invention relates to a method for enhanced cooling of dry rubber crumb by transferring the rubber particles from a first stage pneumatic conveyor with a hot wet air stream to a second stage pneumatic conveyor with a cool dry air stream by means of an interstage cyclone separator which transfers the particles form one fluid stream to the other.

A typical elastomer drying process utilizes a devolatizing extruder discharging to a pneumatic conveying system. The rubber particles are cooled in the pneumatic conveyor, and are subsequently conveyed to and discharged into an enclosed vibrating conveyor. The rubber particles are cooled further in the vibrating conveyor, and thence are transported via a series of open vibrating conveyors to a baling or packaging area.

The level to which the rubber crumb is able to be cooled prior to exiting the pneumatic conveyor is limited by the saturation temperature of the air and steam mixture in the pneumatic conveyor. If the air temperature is lowered below the saturation temperature, the elastomeric product is undesirably wetted by the free water which is formed.

The foregoing limitation, together with the peculiar properties which characterize the rubber crumb, give rise to several problematic deficiencies which result in system performance and quality concerns. Because the rubber particles entering the enclosed vibrating conveyor from the pneumatic conveyor are still hot, the particles stick to the conveyor surface and agglomerate, thereby causing fouling of the equipment downstream of the pneumatic conveyor. Additionally, the hot rubber which causes the fouling tends to degrade and break away, resulting in contamination of the product. Moreover, the resulting rubber agglomerations cause weight-control irregularities in the packaging area.

Hence, the need exists for a process for cooling rubber particles in an elastomer drying system to a greater extent than the cooling presently achievable in the pneumatic conveyor, prior to presentation of the particles to the enclosed vibrating conveyor. The present invention realizes the preceding object by providing a method, wherein the rubber is transferred from the water-saturated air stream of the first stage pneumatic conveyor, to the cool, dry air stream of a second stage pneumatic conveyor by means of a unique interstage cyclone separator. Once the rubber particles are introduced into the cool dry air in the second stage pneumatic conveyor, the particles are subject to additional cooling over that which is able to be obtained in the first stage pneumatic conveyor. Indeed, the rubber particles may be cooled in the second stage pneumatic conveyor to such an extent that the enclosed vibrating conveyor, and its attendant disadvantages, may be entirely eliminated.

The process of the subject invention, therefore, allows rubber crumb in an elastomer drying system to be cooled and transported to the baling or packaging area in a pneumatic conveying system, without the need for the extraneous cooling and conveying equipment which is presently utilized. Consequently, the product contamination currently associated with the vibrating cooling and conveying equipment is eradicated. Furthermore, the two-stage pneumatic conveying process allows potentially toxic compounds from the devolatizing extruder to be more easily and successfully contained in the discharge air, and offers future potential for adaptation to grades of rubber product which are incompatible with conventional cooling systems.

2. Description of the Prior Art

It is known in the prior art to utilize pneumatic conveyors for transporting or transferring particulate material. For example, U.S. Pat. No. 3,384,420, issued on May 21, 1968 to Fiscus discloses a transfer system wherein particulate material is fed to a hopper, and thence to a tubular conduit system containing an air stream which conveys the material to a separator, for separation of the particulate material from the air stream.

Similarly, U.S. Pat. No. 4,599,016, issued on July 8, 1986 to Mendemblik, teaches a pneumatic conveying apparatus for granular matter comprising a first cyclonic separator for receiving the matter conveyed by an air stream, and a secondary cyclonic air cleaner for removing dust and abrasive particles from the air stream. The granular matter is conveyed from the first cyclonic separator by means of an air stream.

The prior art further discloses diverse methods and means for drying a variety of materials by causing the material to contact a drying medium. For instance, U.S. Pat. No. 2,436,355, issued on June 5, 1946 to Cadot et al, is directed to a process for spray drying dimethylolurea wherein slurry is fed into a chamber to which cold air is admitted in order to effect crystallization or separation of the product.

U.S. Pat. No. 4,365,057, issued on Dec. 21, 1982 to Saito et al. discloses a method for drying polyolefins which are caused to descend in a drying apparatus while contacting counterflowing nitrogen gas.

U.S. Pat. No. 3,629,951, issued on Dec. 28, 1971 to Davis et al, is directed to a spray-drying method for an aerated slurry wherein hot air is provided to the spray-drying chamber, and wherein the dried granules are removed from the chamber onto a conveyor.

Various methods and means for cooling particulate material are also established in the prior art. Exemplary of such teachings is U.S. Pat. No. 4,441,261, issued on Apr. 10, 1984 to Beckmann. The latter patent teaches a method and apparatus for cooling hot bulk material in a cooling bunker by passing cooling gas streams therethrough.

U.S. Pat. No. 4,231,991, which issued to Müller on Nov. 4, 1980, discloses a process and apparatus for cooling lime introduced into a cooling tower. Cool air is drawn into the cooling tower and directed to flow up through the falling lime.

U.S. Pat. No. 4,076,493, issued on Feb. 28, 1978 to Gardner shows a cooling apparatus for particulate material including a shell for receiving the material and air distributing means for releasing cooling air into the material for movement counter to the direction of material flow.

Finally, U.S. Pat. No. 3,265,775, issued to Friedrich on Aug. 9, 1966, is directed to means for cooling and/or drying a granular material by treating the material with a gas flowing in counterflow to the material within a vessel.

It is apparent from the foregoing that the prior art fails to teach or suggest a process for enhanced cooling of an elastomeric material characterized by a two-stage pneumatic conveying system utilized in conjunction with an interstage cyclone separator for transferring the material from a hot wet air stream to a cool dry air stream.

SUMMARY OF THE INVENTION

The invention pertains to a process for cooling dried rubber crumb to temperatures which are compatible with packaging requirements in a closed finishing process. The process involves introducing hot rubber crumb and steam to a first stage pneumatic conveyor containing a first stage air stream, wherein the rubber crumb is cooled to a first temperature. The first stage air stream is combined with the steam formed by evaporation from the rubber to form an air/water vapor mixture, thereby limiting the cooling temperature which is able to be obtained in the first stage pneumatic conveyor to the saturation temperature of the first stage air. Efforts to cool below the saturation temperature in the first stage pneumatic conveyor result in undesirable condensation on the rubber crumb. Hence, the process of the present invention provides for transferring the rubber crumb from the hot wet air of the first stage to a cool dry second stage air stream, which allows the rubber crumb to be cooled down to packaging temperatures. Transferring the rubber crumb from the first stage air stream to the second stage air stream involves presenting the rubber crumb to a separator from the first stage pneumatic conveyor. In the separator, the rubber crumb is separated from the first stage air stream, and is picked up by a second stage air stream introduced through a transition member at the solids discharge of the separator. The transition member presents the rubber crumb to a second stage pneumatic conveyor containing cool, dry second stage air, wherein the rubber is further cooled.

BRIEF DESCRIPTION OF THE DRAWINGS

FIG. 1 is a schematic depicting the process of the invention.

DETAILED DESCRIPTION OF THE PREFERRED EMBODIMENT

The dewatering and drying finishing operations for rubber crumb typically include passing crumb slurry from a solvent stripping section over a dewatering screen, to a dewatering screw press, and thence to a drying extruder. The rubber which enters the drying extruder generally contains about 5 to about 10% volatile matter. The rubber-water mixture is heated in the extruder by mechanical work upstream of the extruder die. A sudden release of pressure occurs as the wet rubber passes through the extruder die plate, causing rapid vaporization of the water contained in the rubber crumb. Thus, at the discharge of the drying extruder, the water contained in the rubber flashes as steam, and heat is transferred from the rubber to the water so as to achieve drying and some cooling of the rubber crumb.

The water evaporated at the extruder die is combined with air in a device installed at the discharge of the drying extruder so as to prevent recondensation of the water on the dry crumb. This device contain a variable die through which the hot rubber and water pass, and an open chamber into which flows the rubber, the water which has vaporized in passing through the die and the conveying air stream, and from thence, to a first pneumatic conveyor for additional heat removal.

Providing that the extruder die temperature is sufficiently high, drying of the rubber crumb occurs as the rubber-water mixture passes through the die. In some cases, however, the temperature of the rubber crumb at the extruder die is limited by the product quality requirements, or by environmental factors, and incomplete drying occurs at the die. It is thus necessary that further drying, as well as cooling, of the rubber crumb occur in the first pneumatic conveyor.

The degree to which the rubber crumb is able to be cooled in the first pneumatic conveyor is limited by the requirement that the exit air temperature for the first pneumatic conveyor be maintained at about 45° to about 60° C. for about 6 to about 10% of water evaporated off the rubber at the extruder die. Heat is removed from the rubber-water mixture in the first stage pneumatic conveyor by means of natural convection cooling in the form of heat transfer to the conveying air and heat loss of the air and rubber through the conveying system piping, or by forced convection via utilization of a cooling water jacket on the exterior of the pneumatic conveyor pipe. However, efforts to cool the rubber below the saturation temperature of the conveying air stream result in undesirable condensation on the dried rubber crumb. Consequently, the rubber crumb in the pneumatic conveyor typically is discharged to an enclosed fluidized vibratory conveyor for further cooling of the rubber crumb to baling or packaging temperatures.

As previously noted, however, the rubber crumb which enters the fluidized vibratory conveyor is still hot, and sticky, and thus creates severe problems for the system components, as well as for the final product. In particular, the fine rubber particles stick to metal surfaces in the fluidized vibratory conveyor, thereby necessitating the dedication of excessive manpower and downtime of the system in order to clean the equipment. The hot rubber responsible for the fouling may degrade and break away, resulting in contamination of the product. Additionally, product may be lost through the exhaust air from the fluidized vibratory conveyor. Moreover, the rubber particles which agglomerate cause weight irregularities in the baling and packaging area. The process of the present invention overcomes these enumerated deficiencies by allowing for further cooling of the rubber crumb over that normally obtainable in the first stage pneumatic conveyor.

With reference to FIG. 1, wherein the subject process is depicted schematically, it can be seen that pick-up device 12 is installed at the discharge of the drying extruder. Air from a blower is introduced into the pick-up device to convey the dry crumb particles and to prevent recondensation of steam on the dry crumb particles received therein. From the pick-up device, the rubber crumb, steam and air enter a first stage pneumatic conveyor 14, and exit this pneumatic conveyor via an interstage cyclone separator 16. The interstage cyclone separator 16 is provided with a tangential inlet at its upper end for introduction of the first stage steam-air-rubber crumb mixture, and a solids discharge at its lower end. A transition member 20 is associated with the lower end of the cyclone separator 16.

The interstage cyclone separator 16, together with transition member 20, separates the rubber particles from the first stage hot wet air stream of the first pneumatic conveyor and transfers them to the fresh, dry cool second stage air stream. The rubber crumb particles are introduced into the interstage cyclone separator 16 through the tangential inlet, while fully entrained in the wet hot air stream. Within the interstage cyclone separator 16, the rubber particles experience a downward helical motion in approaching the transition member 20. The transition member 20 comprises a cone-shaped member which forms an angular gap 22 around the lower end or solids discharge of the interstage cyclone separator 16. The annular gap 22 serves as an inlet for the cool, dry fresh air of the second stage, with the cool dry air entering through the annular gap 22 and picking up the rubber particles as they exit from the base of the cyclone separator 16, carrying them to the second stage pneumatic conveyor 24. The transition device 20 is adapted to be lowered or raised with respect to the base of the cyclone separator 16 so as to vary the size of the annular gap 22 to accommodate diverse processing requirements. The annular gap 22 is specifically designed to evenly distribute the second stage air around the peripheral walls of the transition member 20 at adequate conveying velocities.

The introduction of cool dry air through the annular gap 22 creates a constant flow of air proximate the solids discharge of the cyclone separator 16. Consequently, the high air velocity of the cool dry air along the walls of the transition member 20 prevents the transition member 20 from becoming fouled by the hot sticky rubber particles.

The interstage cyclone separator 16 is subject to a slight positive pressure. Thus, pressure drop in the second pneumatic conveyor 24 backpressures the cyclone separator 16, forcing the wet hot air of the first stage to leave the cyclone separator 16 via exhaust 26. The exhaust rate is adapted to be regulated with a valve 28 to be equal to or less than the rate of input of the first stage air to the cyclone separator 16. The cyclone separator 16 and transition member 20 result in about 99 percent or more of the rubber, along with leakage of only about 10 to about 20% of the first stage air, entering the transition member 20. Thus, a typical level for separation of the first stage air is about 90%. If insufficient pressure is available to achieve an adequate exhaust rate for the first stage air, a suction device may be provided at the cyclone separator exhaust 26 to control the exhaust of the first stage air. It is not unusual, however, for the exhaust rate to range from about 60 to about 150%.

The interstage cyclone separator 16 is characterized by a vortex, whereby some first stage air is always flowing proximate the solids discharge of the cyclone separator 16 in the region where fouling would normally occur due to low velocities. Furthermore, the potential for fouling can be virtually eliminated by providing a cooling water jacket around the interstage cyclone separator.

As previously noted, the temperature reduction for the rubber crumb available in the first stage pneumatic conveyor 12 is limited by the dew point of the first stage air. With conventional rubber finishing systems, further cooling of the rubber is required, being provided by the fluidized vibratory conveyor 14, and subsequent transfer conveyor systems prior to presentation to the packaging area. According to the present invention, the additional cooling of the rubber crumb obtained in the second stage pneumatic conveyor 24 may allow for elimination of the fluidized vibratory conveyor, it being possible to cool the rubber crumb to packaging temperature requirements in the second stage pneumatic conveyor.

As can be seen in FIG. 1, the second stage pneumatic conveyor 24 discharges to a second cyclone separator 30, wherein the cooled rubber is separated from the second stage air stream and presented to the baler weight scale conveyor 32 positioned below the cyclone 30. The rubber is then discharged to the baler in conformance with the requisite packaging temperature requirements. Indeed, the only limitations on the final rubber temperature with the instant process are the rubber particle size, the length of the pneumatic conveyors and the air temperature of the first and second stage air streams. These parameters are adapted to be varied to achieve the desired product temperature at the exit of the second cyclone separator 30. The following examples illustrate the process of the present invention. EP rubber as identified in Examples 1 and 2 means Ethylene-Propylene copolymer rubber.

EXAMPLE 1

For an EP rubber grade at a feed rate of 250 to 290 kg/hr; a temperature at the extruder die of 205° to 225° C.; a first stage pneumatic conveyor around 50M in length; a first stage air rate of around 305 kg/hr; a second stage pneumatic conveyor 35M in length; a second stage air rate of 280 to 440 kg/hr at a temperature of 30° to 50° C.; an interstage cyclone exhaust rate of 78 to 150% gives rise to a rubber temperature of 130° to 150° C. at the interstage cyclone and a rubber temperature of around 95° C. at the second cyclone.

EXAMPLE 2

For an EP rubber grade at a feed rate of 90 to 140 kg/hr; a temperature at the extruder die of 200° to 244° C.; a first stage pneumatic conveyor 17 to 50M in length; a first stage air rate of 305 to 310 kg/hr; a second stage pneumatic conveyor 33 to 70M in length; a second stage air rate of 195 to 280 kg/hr at a temperature of around 30° C.; an interstage cyclone exhaust rate of 143 to 310 kg/hr, gives rise to a rubber temperature of 85° to 120° C. at the interstage cyclone and a rubber temperature of around 29° to 69° C. at the second cyclone.

EXAMPLE 3

For rubber pellets at a feed rate of 130 to 135 kg/hr; a temperature at the extruder die of around 205° C., a first stage pneumatic conveyor around 17M in length; a first stage air rate of 175 to 310 kg/hr; a second stage pneumatic conveyor around 33M in length; a second stage air rate of 150 to 260 kg/hr at a temperature of around 30° C.; an interstage cyclone exhaust rate of 175 to 310 kg/hr results in a rubber temperature of around 120° C. at the interstage cyclone and a rubber temperature of around 65° C. at the second cyclone.

While the invention has been described in connection with illustrative examples and a preferred embodiment, it is to be noted that various modifications and changes may be made to the invention without departing from the scope of the invention as defined in the appended claims.

What is claimed is:

1. A process for cooling rubber crumb in conjunction with a first stage pneumatic conveyor, an interstage separating means, and a second stage pneumatic conveyor, said interstage separating means having an inlet at an upper end and a solids discharge at a lower end of said interstage separating means, a transition member associated with said solids discharge, said transition member defining an annular opening with respect to said solids discharge, said annular opening being a variable opening, said transition member communicating with said second stage pneumatic conveyor, which comprises the steps of:
   (a) passing said rubber crumb to said first stage pneumatic conveyor containing a first stage air stream;
   (b) cooling said rubber crumb in said first stage pneumatic conveyor in said first stage air stream to a first temperature, said first stage air stream comprising wet hot air, said cooling being limited by the saturation temperature of said first stage air stream;
   (c) passing said cooled rubber crumb in said first stage air stream to said inlet of said interstage separating means;
   (d) separating said cooled rubber crumb from said first stage air stream in said interstage separating means;
   (e) introducing a second stage air stream through said annular opening of said transition member, said second stage air stream comprising cool dry air;
   (f) transferring said cooled rubber crumb from said first stage air stream to said second stage air stream proximate said solids discharge of said interstage separating means;
   (g) passing said cooled rubber crumb in said second stage air stream to said second stage pneumatic conveyor; and
   (h) further cooling said cooled rubber crumb in said second stage pneumatic conveyor in said second stage air stream to a second temperature, said second temperature being lower than said first temperature.

2. The process of claim 1, wherein said interstage separating means comprise a cyclone separator.

3. The process of claim 1 wherein said transition member comprises a cone-shaped member associated with said solids discharge of said interstage separating means.

4. The process of claim 1 further comprising the steps of:
   (a) passing said further cooled rubber crumb in said second stage air stream to a second separating means;
   (b) separating said further cooled rubber crumb from said second stage air stream in said second separating means; and
   (c) transferring said further cooled and separated rubber crumb to a packaging area.

* * * * *